United States Patent [19]

Comroe

[11] 4,230,305
[45] Oct. 28, 1980

[54] FISH GRABBER FOR USE IN ELECTRICAL WIRE INSTALLATION

[76] Inventor: Stephen S. Comroe, 1208 Lindsay La., Rydal, Pa. 19046

[21] Appl. No.: 76,838

[22] Filed: Sep. 19, 1979

[51] Int. Cl.³ .......................................... B65H 59/00
[52] U.S. Cl. ......................................... 254/134.3 FT
[58] Field of Search .............. 254/134.3 FT, 134.3 R, 254/134.7; 15/104.3 SN, 104.3 G, 104.3 R

[56] References Cited

U.S. PATENT DOCUMENTS

| | | | |
|---|---|---|---|
| 1,588,737 | 6/1926 | Hurd .............................. | 15/104.3 SN |
| 1,680,322 | 8/1928 | Crittenden et al. ........... | 15/104.3 SN |
| 2,567,923 | 9/1951 | Burke ........................... | 15/104.3 SN |

Primary Examiner—Robert C. Watson

[57] ABSTRACT

An electrical installation tool for use in electrical wire installations in areas of varying and unknown configuration comprising of a movable cable with a handle end and an adjustable fish wire end. The adjustable fish wire end is provided in the form of a bundle of flexible loops. Each of the flexible loops has an outer end that is secured to the cable fish wire end with the other end of each of the flexible loops being effectively held together at an intermediate point. The loops flare outwardly in a convex bundle, whereby the cable fish end can be moved back and forth. This movement has the effect of varying the distance between the cable fish wire end and the intermediate point, thereby to vary the flaring of the loop bundle to allow passage of the loop bundle or expansion or contraction of the loop bundle, as desired, in an area of varying or unknown configuration.

4 Claims, 11 Drawing Figures

FISH GRABBER FOR USE IN ELECTRICAL WIRE INSTALLATION

This invention relates to a fish grabber for use in electrical wire installation, and more particularly this invention relates to a fish grabber that is to be used for fishing wires in concealed hollow spaces within existing buildings and especially to be useful in areas of varying or unknown configuration.

In electrical construction, communications, alarm systems and general construction industries, it is often necessary to pass wires from one point in a building to another point. Since inspection agencies and building codes require wires to be concealed within the interior spaces of the floors, walls, and ceilings, the only practical device presently used within the trades is a so called fish wire. A fish wire device presently in great use comprises a pair of wires with a small hook on each end. The hook ends are inserted within the hollow cavity behind panels in a building, from two different points. The operation involves the pushing by one person or two persons of the fish wires blindly toward each other, until it can be determined that one fish wire has been hooked upon the other fish wire. This method is quite cumbersome and also very time consuming.

The invention herein disclosed has as its principal object the provision of a fish wire for use in electrical installation. The fish grabber of the present invention can be placed within the hollow building cavity in such a manner to allow a technician to have the equivalent of numerous hooks, to enable the easy hooking of a conventional fish wire being directed from another direction.

A principal advantage of the present invention is that the fish grabber thereof is presented as a flexible bundle and can be guided around obstructions within the building cavity. Moreover, the fish grabber of the present invention can be retracted so that it can be inserted through a relatively small opening and then expanded to a relatively large and flexible bundle size. By virtue of the foregoing the grabber bundle can be made to follow the contour of a narrow hollow space and then expand to fill the entire cavity to provide the largest possible target for a fish hook.

Examples of prior devices are those shown in U.S. Pat. Nos. 3,035,817 and 4,083,532. However, such devices do not allow easy adjustment of the flaring of a loop bundle, nor adjustment of the bundle to maximum flaring to allow for the largest possible target so that the user can easily use a fish wire and attach the same to the flexible flared bundle.

Many objects and achievements of the present invention will be more readily appreciated by reference to the following views of the drawings wherein.

Referring now in greater detail to the various figures of the drawing wherein like reference numerals refer to like parts there is shown generally in FIG. 1A the present art of fishing wires.

Figure 1B:
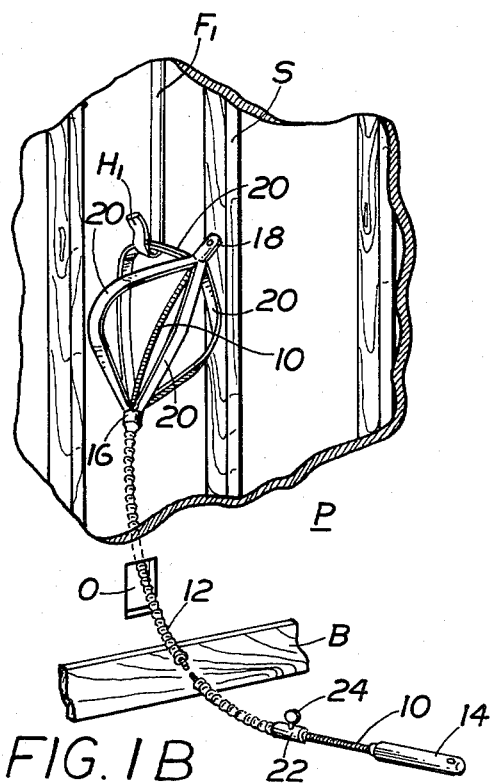
FIG. 1B is a view showing the device of the present invention, located within a hollow building space, with the device of the present invention having been brough to an expanded position.
Figure 1A:
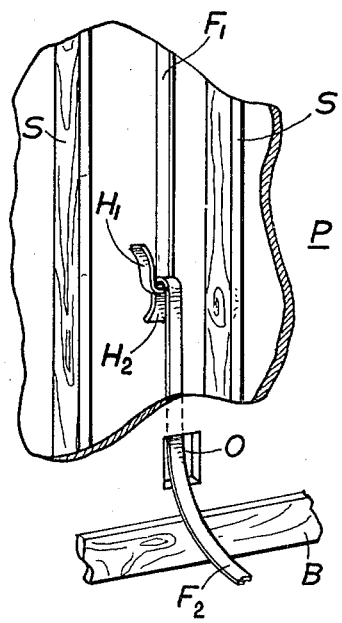
FIG. 1A is a view showing the present art of fishing wires.

In particular FIG. 1A shows fish wire F1 with hook end H1 having been looped about hook end H2 of lower fish wire F2. As further shown in FIG. 1A, there is a panel P, conventional studs S, defining the available hollow space behind the panel P. The lower fish wire F2 enters the available space through an opening O formed in panel P. Also shown in FIG. 1A is the baseboard B.

Figure 2:
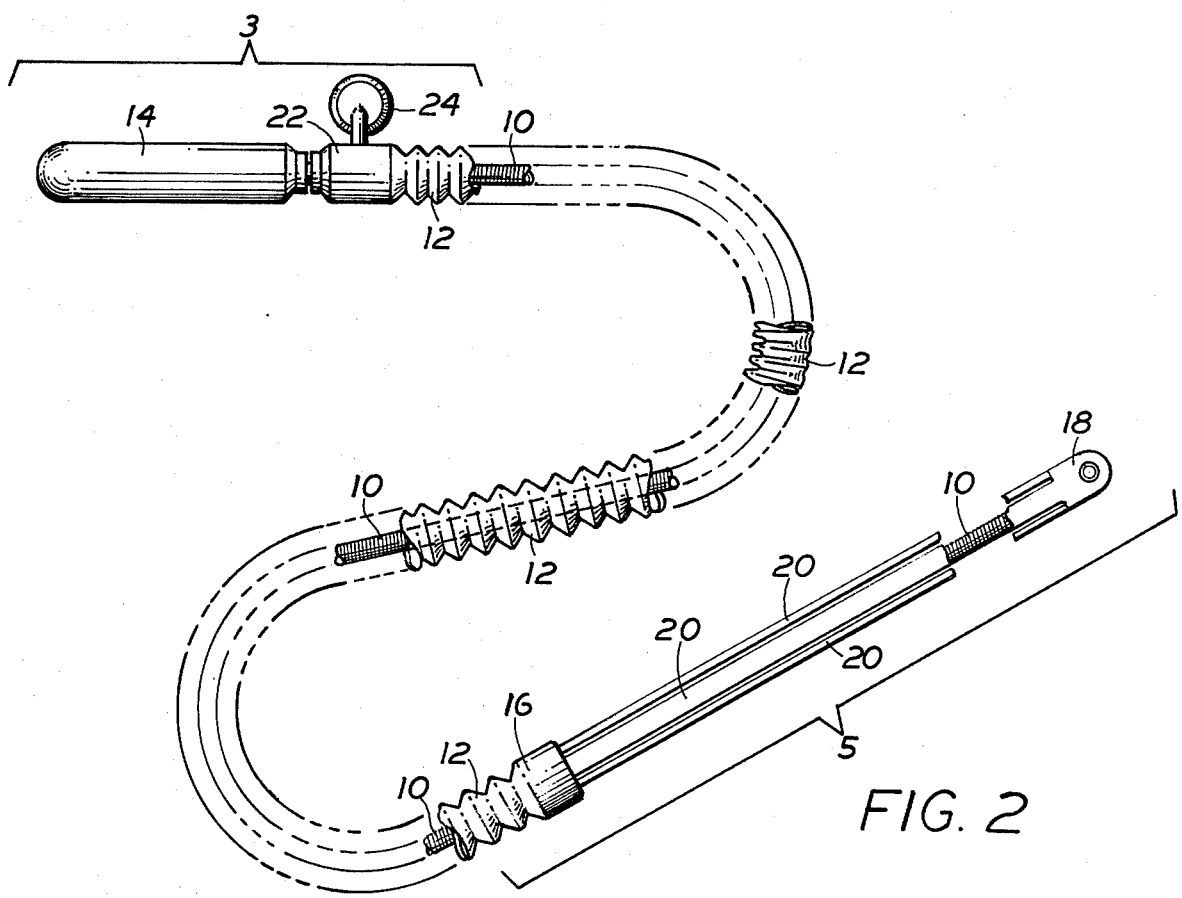
FIG. 2 is an enlarged view of the fish grabber of the present invention, with certain portions broken away for the sake of clarity.

The fish grabber of the present invention is generally shown in FIG. 1B as comprising of a moveable cable 10 which extends through a flexible housing 12. The end of cable 10 is secured to handle 14. This end of the cable 10 will be known as the handle end. As further shown in FIG. 1B the cable 10 extends completely through the flexible housing 12 with an outer end of the cable 10 extending beyond the outer collar end of flexible housing 12. The outer end of the cable 10 terminates in a tab junction 18 which includes the ends of loops 20. It is thus seen that the outer end of loops 20 will be movable either towards or away from the collar 16 dependent upon the movement of the handle end of cable 10 relative to the flexible housing 12. For instance attention is called to FIG. 2 wherein cable has been brought to its forwardmost position such that handle 14 actually contacts clamp 22 which is secured to the housing 12. This in turn causes the outer end of cable 10 to be moved most distantly from the collar 16 whereby each of the loops 20 appear flat as shown in FIG. 2.

Figure 9:
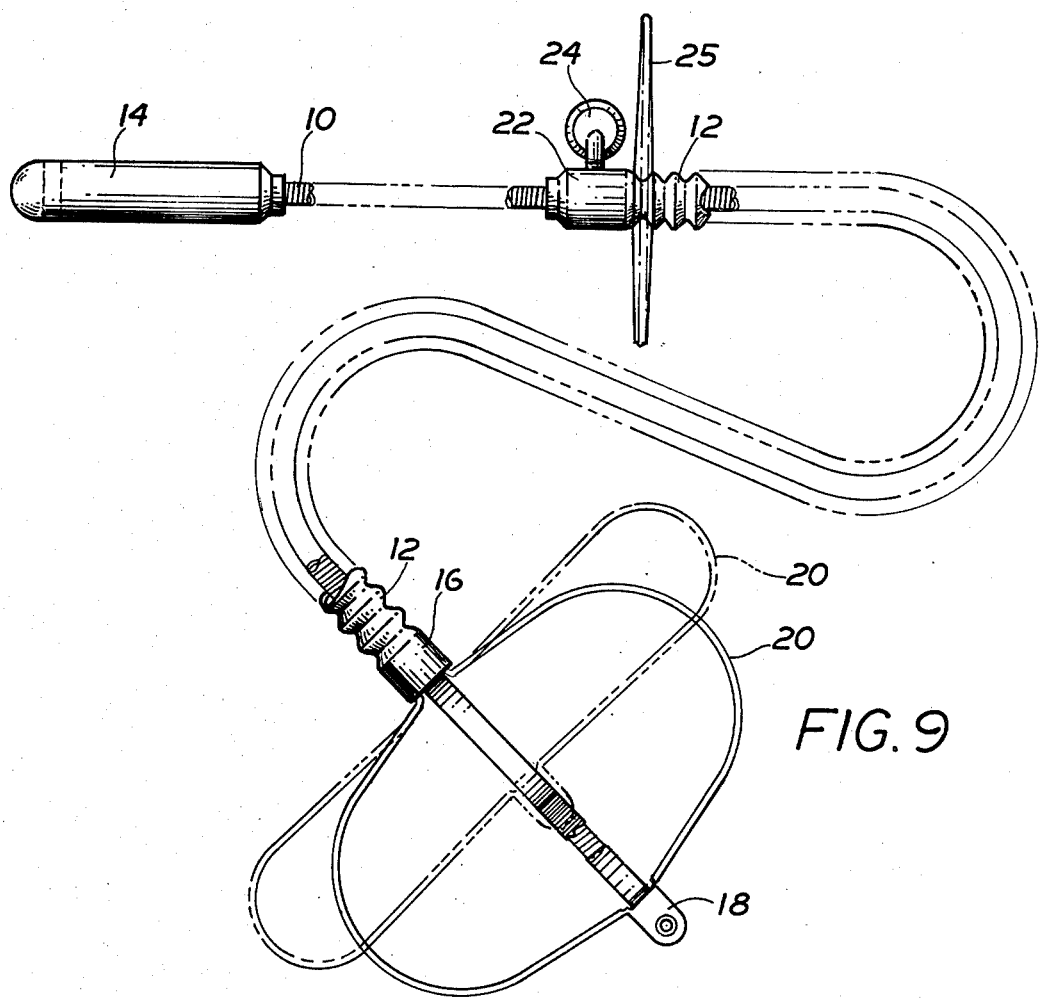
FIG. 9 is a view similar to FIG. 2 but wherein the flexible bundle has been expanded to the outwardly flared position as compared to the fully extended or flat condition of FIG. 2.

As best seen in FIG. 9, a wing device 25 can be positioned on or near clamp 22, on the bundle side thereof. The wing device 25 limits the penetration of flexible housing 12 behind a panel or other device so that handle 14 cannot be pulled behind a panel once contact is made by a fish wire that has been latched onto bundle 20. As further seen in FIG. 9 the handle 14 is withdrawn as far as possible away from clamp 22. This in turn causes a retraction of the outer end of cable 10 or in other words, the tab junction 18 now lies as close as possible to the collar 16. In this condition loops 18 are at the most flared position in bundle 20.

In a preferred embodiment of the invention the cable 10 will be of a flexible plastic with the loop 20 also being flexible strands. The loops 20 are secured at one end to tab junction 18 in a type of sandwich construction being a suitable cement. The flexible housing 12 may also be of a suitable plastic or of metal. A material that is particularly useful in connection with the formation of the loops 20 is a flexible nylon.

Figures 3, 4:
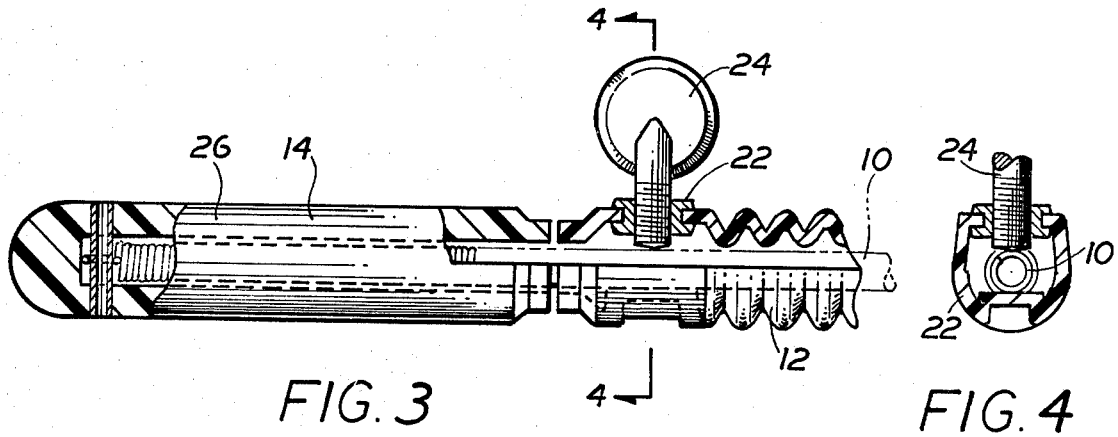
FIG. 3 is an enlarged view, partially in section, taken along the line 3 of FIG. 2.
FIG. 4 is an enlarged sectional view taken along the lines 4—4 of FIG. 3.
Figure 5:
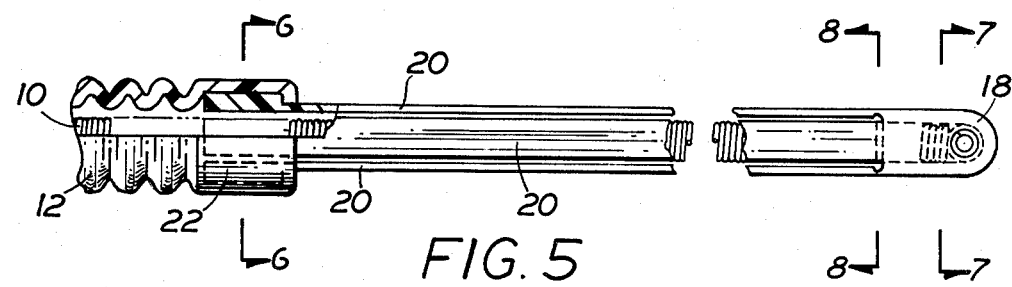
FIG. 5 is an enlarged view taken along the line of 5 of FIG. 2.
Figures 6, 7, 8:
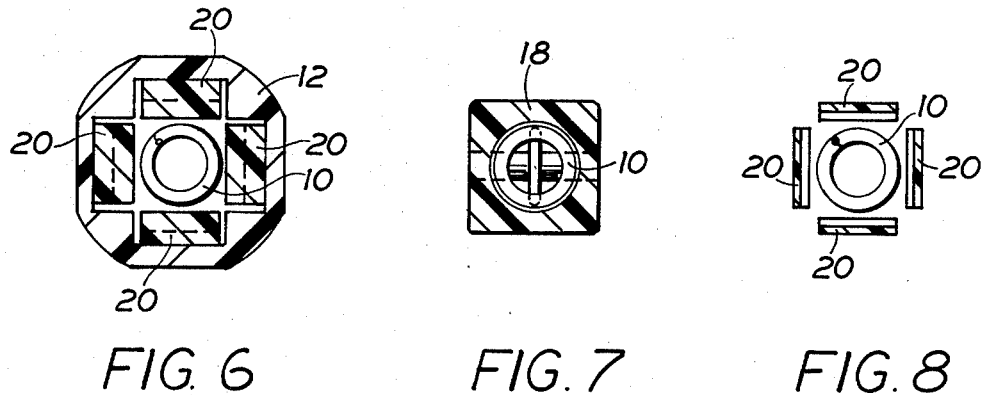
FIGS. 6,7,8 are respectively enlarged sectional views taken along the lines 6—6, 7—7, 8—8 of FIG. 5.

The clamp 22 is provided with a set screw which extends through the clamp 22 as best seen in FIG. 4. The purpose of the set screw 24 is to enable the adjustment of the cable 10 to a desired position. Thus the cable 10 can be held in a desired position. For instance, it may be desired to achieve a bundle flexing somewhat between the extreme position of FIG. 2 and FIG. 9. This will not be known until the bundle in the flattened condition of FIG. 2 is inserted through the opening in the panel and then moved towards a desired position and insertion of the bundle is halted. At this time the cable 10 is urged outwardly, or, in other words the handle 14 is pulled away from the clamp 22 until resistance is met by the expanding loops 20 within the particular space. At this time it is desireable that the set screw 24 be tightened so that the flexing of the loops 20 will be maintained. The flexing of the loops 20 will be maintained even if further resistance is met. The fish wire F1 is now moved from an opposite direction and is quickly hooked upon one or more of the loops 20 as shown in FIG. 1B. The set screw 24 is loosened and handle 14 is pushed towards clamp 22 so that the flexible loops 20 will compress and trap the standard fish hook H1. At this point the fish grabber assembly is removed from the building cavity along with standard fish F1 to complete the fishing operation.

Figure 11:
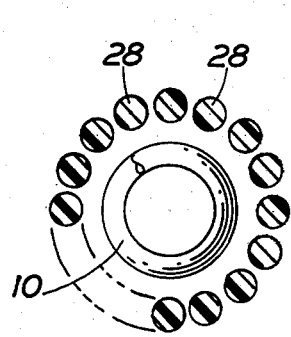
FIG. 11 an enlarged sectional view taken along the lines 11—11, of FIG. 10.
Figure 10:
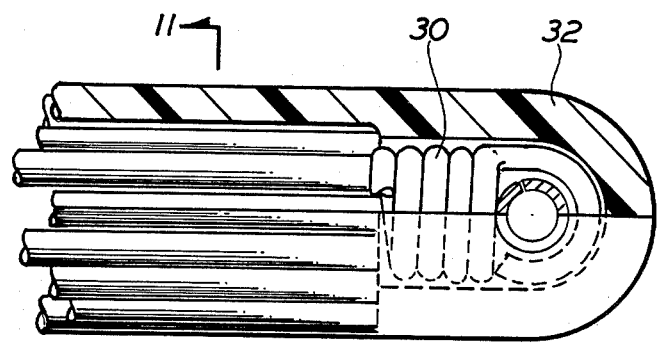
FIG. 10 is an enlarged sectional view showing a portion of one end of the flexible bundle loops as secured together to the cable end.

Obviously, the cable 10 is infinitely adjustable with reference to the clamp 22 so that the particular desired flaring of the loops 20 can be readily achieved. A variation of the invention is shown in FIG. 10 and FIG. 11 wherein the loops 20 are provided in the form of a relatively large number of flexible strands which are brought together using a coiled device 30 within the housing 32 which takes the place of the tab junction 18.

From the foregoing it is clear that the present invention provides a fish grabber for use in electrical wire installation which is easily inserted and set up for use. As previously discussed the flexible loops can be brought to a flattened or compact position as best illustrated in FIG. 2. This enables the quick and easy insertation of the cable fish wire end of the tool of the present invention within a particular opening of relatively small dimensions of opening 0 in FIG. 1B.

After the fish wire end has been inserted a desired amount, the handle 14 is moved away from the clamp 22. This in turn causes the tab junction 18 to be pulled or lunged toward the collar 16, thereby flexing the loops 20 to a desired degree. Then the desired flexing of the loops 20 has been achieved, the set screw 24 is tightened to hold the cable and wings 25 prevent any further penetration of the device even if there is an inward pull exerted by a fish wire that has been looped from the opposite direction. The actual fish operation is completed by the use of conventional fish wire F1 which can hook upon any one or more of the loops 20 to complete the fishing operation.

The present invention does not offer any special advantages when used in a conduit of generally constant known configuration or cross section. Indeed, it is now rare to use a fish device in a conduit since superior vacuuming techniques are now in wide use and have replaced fish devices such as those shown in the two patents cited herein above. Also, the wing device 25 would prevent significant penetration into a conduit.

By virtue of the foregoing description of a preferred embodiment of the invention, other variations of the invention will occur to one skilled in the art. It is to be understood that the invention is particularly suitable for use within a space of unknown or hidden configuration.

While the above descriptions contain many specificities, these should not be construed as limitations on the scope of the invention, but rather as an exemplification of one preferred embodiment thereof. Many other variations are possible, for example, the bundle of flexible loops FIG. 20 can be manufactured so as to be a replaceable unit. Should the bundle become caught on a concealed object, it is possible that forceable extraction of the fish grabber will cause one or more strands of the flexible loops to be torn or damaged. Replacement of the flexible loop section FIG. 20 would avoid buying a complete new fish grabber assembly.

I claim:

1. An electrical installation tool for use in electrical wire installation in areas of varying or unknown configuration, said tool comprising a hollow flexible housing, a flexible movable cable passing through said housing and having a handle end and fish wire end, a bundle of flexible loops, each having an outer end secured to said cable fish wire end, with free ends of each of the loops being fixedly held together in a movable junction to form a loop bundle, and wherein the loop bundle comprises flexible loops flaring outwardly, and means to grasp said handle end of said cable to move the fish wire cable in a direction inwardly or outwardly of said housing, thereby to vary the flaring of said loop bundle to allow passage thereof or expansion or contraction thereof to adapt the loop bundle to varying or unknown configurations.

2. The tool of claim 1 wherein said loops flare outwardly in a convex bundle.

3. The tool of claim 2 including an adjustable set screw passing through said housing to bear against said cable to hold said cable in a desired position.

4. The tool of claim 3 including a wing device mounted in said housing to limit penetration thereof through an opening.

* * * * *